M. LEEFSON.
DEVICE FOR OPENING AND HOLDING THE MOUTHS OF FISH, &c.
APPLICATION FILED FEB. 26, 1909.
974,500. Patented Nov. 1, 1910.
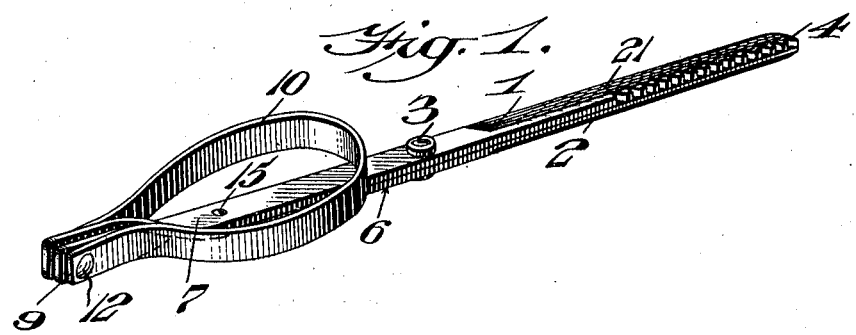
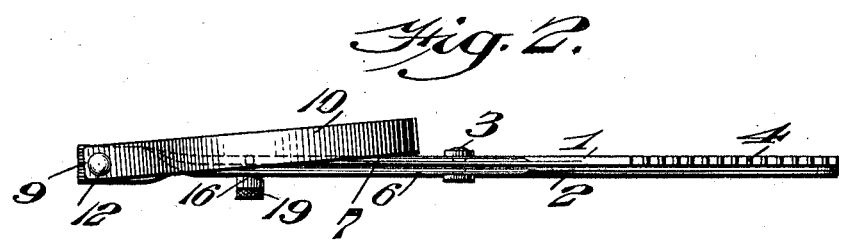
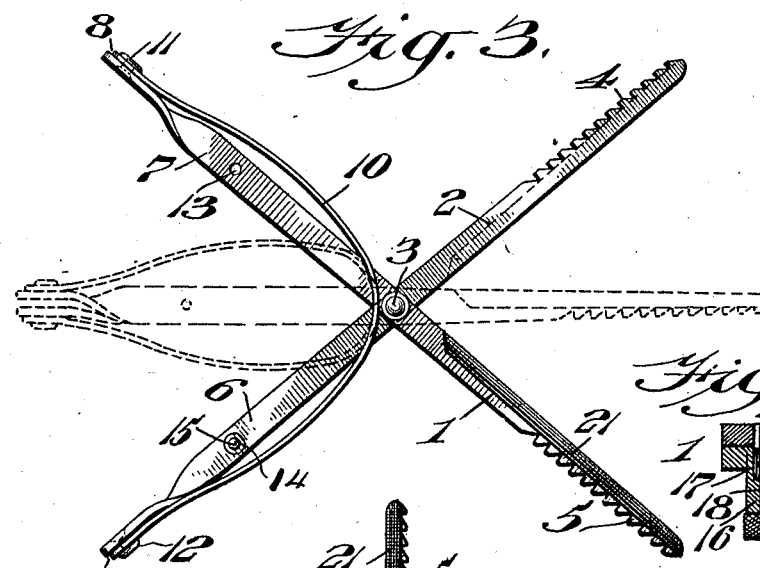
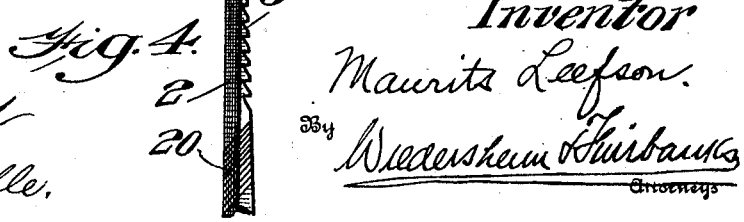

UNITED STATES PATENT OFFICE.

MAURITS LEEFSON, OF PHILADELPHIA, PENNSYLVANIA.

DEVICE FOR OPENING AND HOLDING THE MOUTHS OF FISH, &c.

974,500.   Specification of Letters Patent.   Patented Nov. 1, 1910.

Application filed February 26, 1909. Serial No. 480,146.

*To all whom it may concern:*

Be it known that I, MAURITS LEEFSON, a subject of the Queen of Holland, residing in the city and county of Philadelphia, State of Pennsylvania, have invented a new and useful Device for Opening and Holding the Mouths of Fish, &c., of which the following is a specification.

This invention relates to a device for opening and holding open the mouth of a fish in order that a hook may readily be removed therefrom without any danger to the person extracting the same.

It is well known that certain kinds of fish are very hard to handle when removed from the water and it is exceedingly difficult to extract the hook from the mouth of the fish without being bitten or cut while wounds so occurring are always painful and more or less dangerous owing to the poisonous nature of the teeth or horns of the fish as the case may be.

In my present invention, I have devised a simple and efficient means for preventing injuries while handling fish or removing the hook from the mouth thereof, by means of which only one hand of the user is necessary to operate it and after the device is once in operative position, both hands may be used in handling the fish and removing the hook, the device in the meanwhile maintaining the mouth of the fish suitably in open position.

In the drawings I have shown a construction for carrying out my invention which I have found in practice will operate successfully, but I desire it understood that the arrangement of the parts may be varied, changes may be made in the construction, and other instrumentalities may be employed which will come within the scope of my invention, and I do not therefore desire to be limited in every instance to the form herein shown and described but I may make such changes as may be necessary.

Figure 1 represents a perspective view of a device embodying my invention. Fig. 2 represents a side elevation of the same. Fig. 3 represents a plan in operative position. Fig. 4 represents a detail of a position of one of the jaws. Fig. 5 represents a sectional view, showing the fastening means and the jaws in closed position.

Similar numerals of reference indicate corresponding parts in the figures.

Referring to the drawings:—1 and 2 designate suitable jaws pivoted together by a bolt 3 or equivalent means, the jaw 1 being provided adjacent one end with a plurality of teeth 4 while the jaw 2 is similarly formed with teeth 5 and the jaws so positioned when joined together and in normally closed position are superimposed and the toothed surfaces are on opposite sides of the respective jaws so that when in distended position, that is, the operative position of the jaws, both sets of teeth will be outwardly disposed and in engaging position.

6 and 7 designate arms preferably integral with the jaws 1 and 2, the ends of said arms, in the present instance, being given a suitable turn or twist, to form flat bearing surfaces 8 and 9, with which coöperates the device for causing the jaws to assume an open position and maintaining them in such position. This device in the present instance, consists of a spring 10 secured in the present instance, to the surfaces 8 and 9 by means of pivots 11 and 12, whereby a free swinging movement of the spring may be obtained. Normally and in order to obtain the maximum leverage of the spring 10 to force the arms 6 and 7 apart, the spring is located as inclosed in the figures, that is, folded back substantially adjacent the arm members.

13 and 14 designate respectively, apertures in the arms 7 and 6 which are preferably similarly located so that in closed position of the device these apertures will come into alinement and permit the insertion of a fastening means to maintain the device inoperative. This fastening means consists of a stud 15 which is adapted to be inserted through both of the apertures and the tension caused by the spring 10 upon the arms creates a gripping action of the arms 6 and 7 upon the stud 15 and firmly holds the same in the apertures 13 and 14 and holds the arms in locked position. This stud 15 is preferably of a slightly smaller diameter than either of the apertures 13 or 14 in order to provide a small amount of play and thus permit ready releasing of the locking means when the ends of the arms 6 and 7 are forced together overcoming the tension of the spring 10, thus relieving the strain upon the stud 15 which thereupon drops out of the apertures and the spring 10 forces open the jaws 1 and 2 when the user releases his hold of the arms 6 and 7.

In order to prevent the stud bolt 15 from becoming lost, it is preferable to provide some means for securing the same to a part of the device and it will be readily apparent that any means may be employed for the desired end. In the present instance such means consists of a bushing 16 secured in any suitable manner in one of the openings 13 and provided with an enlarged bore 17 of a diameter sufficiently large to receive the stud 15 and thus prevent the same from falling out of place. As here shown, the stud 15 has a spindle 18 secured thereto and passing through the opening of the bushing 16 and terminating in a head 19 whereby the same may be manually manipulated. It will be apparent if the device is held as shown in Fig. 2 and the spring 10 compressed that the stud 15 will drop by gravity into the enlarged bore 17 whereby the two jaw members are permitted relative movement and at the same time the stud does not become separated from its coöperating parts.

20 designates a roughened surface on one of the jaws whereby a file portion is formed well adapted for taking the rough edges off of and sharpening fish hooks.

21 designates a cutting edge formed on each jaw and in opposed relation relative to each other whereby a shearing effect is possible and the device may be utilized for cutting bait or decapitating or dismembering fish or the like.

It will be noted that when the device is in normally closed position, as shown in Fig. 1, the edge of the spring 10 forms a very efficient scraper for removing scales from a fish.

In operation the device is normally in the position indicated in Fig. 1 and should it be desired to remove a hook from the mouth of a fish and thereby prevent injury to the person from the teeth of the fish, the jaws 1 and 2 are placed in the mouth of the fish. As soon as properly positioned, a slight closing pressure of the spring 10 allows the bolt stud 15 to drop out, whereupon loosening the grip upon the spring 10, the jaws spring open, thus not only prying the mouth of the fish sufficiently wide to remove the hook but also holding the same and preventing the fish biting or wounding a person during its struggles while the hook is being removed.

It will be apparent that I have devised a very simple and efficient means for performing the functions intended, one in which several combined features are possible, such as a scraper means for removing the scales and a device for sharpening the hooks. It may be here mentioned that it is desirable to make the jaws 1 and 2 and their arms 6 and 7 of a length corresponding to the minimum length allowed by law for the fish caught. That is to say, if the smallest which may be taken from the water is to be nine inches long, the total length of the jaw members will be nine inches and therefore at all times the fisherman in case of doubt has a means of quickly and easily determining whether or not the fish should be returned to the water as soon as caught. This measurement of the fish will be easily accomplished since it will be seen from Fig. 3, when the jaws and arms are separated or extended, that they stand substantially at right angles to each other, so that, if for example, the jaw 1 is placed laterally across a fish, the latter will extend parallel with and be adjacent to the jaw 2 and arm 7, so that the length of the fish can quickly be determined, while the jaw 1 holds the said fish.

Having thus described my invention, what I claim as new and desire to secure by Letters Patent, is:—

1. In a device of the character described, a pair of jaws pivoted together and superimposed in closed position, a toothed portion on each jaw and in opposed relation to the toothed portion of the other jaw, a bowed spring normally tending to maintain said jaws in diverged position, and locking means adapted to pass through both of said jaw members, said locking means holding the jaws in superimposed position and automatically actuated to release said jaws by a closing pressure of said spring.

2. In a device of the character described, a pair of jaws pivoted together, a spring normally tending to maintain said jaws in diverged position, an arm secured to each jaw and having an opening therein, one of said openings being counterbored and a stud to lock said jaw adapted to pass through both openings and having a head coöperating with said counterbore whereby displacement of said stud is prevented in unlocked position.

3. In a device of the character described, a member having a jaw portion and an off-set portion, a second member pivoted thereto and having a similar jaw and off-set portion, said members being adapted in closed position to be superimposed and contact substantially throughout the length thereof, a spring secured to said off-set portions and normally tending to open said jaws and locking means for securing the members and jaws in superimposed position.

MAURITS LEEFSON.

Witnesses:
C. D. McVay,
E. B. Morris.